April 19, 1927.
R. D. McINTOSH
1,625,128
WELDING TORCH
Filed Dec. 2, 1925
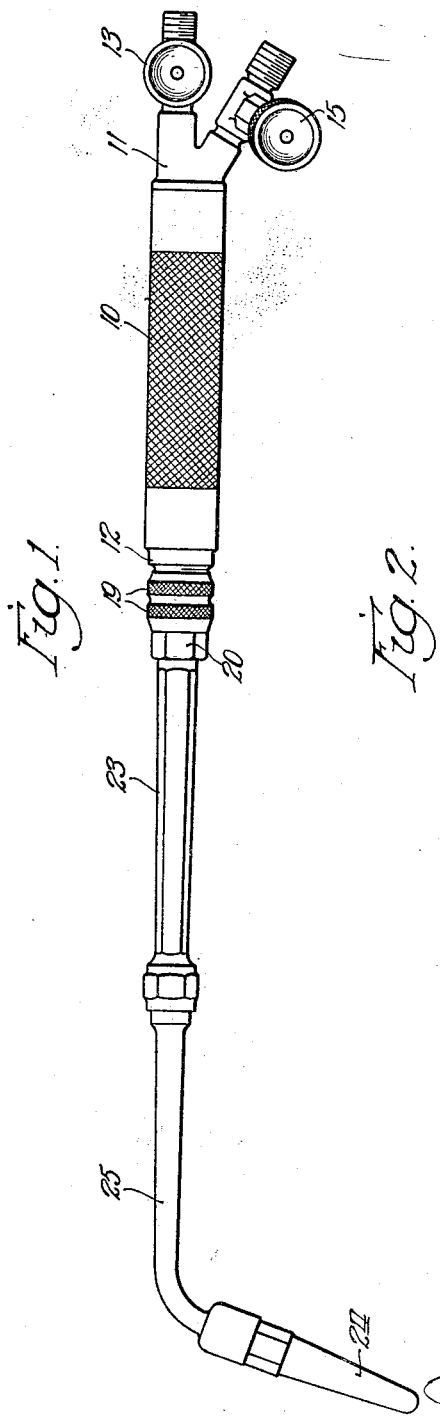
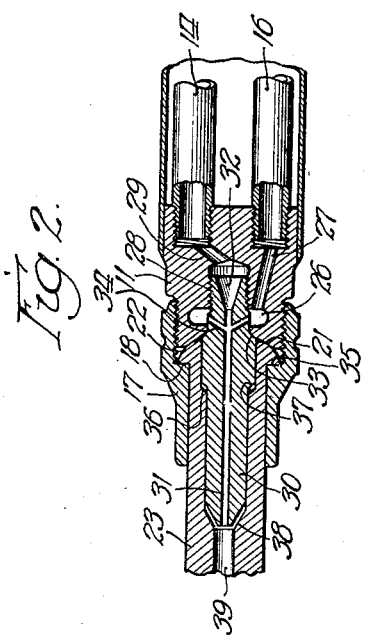
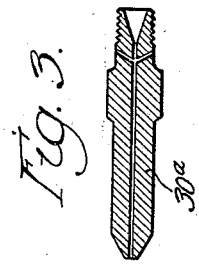
Inventor
Robert D. McIntosh
by John Howard McElroy
his Atty.

Patented Apr. 19, 1927.

1,625,128

UNITED STATES PATENT OFFICE.

ROBERT D. McINTOSH, OF CHICAGO, ILLINOIS, ASSIGNOR TO THE IMPERIAL BRASS MANUFACTURING COMPANY, OF CHICAGO, ILLINOIS, A CORPORATION OF ILLINOIS.

WELDING TORCH.

Application filed December 2, 1925. Serial No. 72,699.

My invention is concerned with welding torches, and is designed to produce a simple and readily manufactured structure of the class described that shall be extremely efficient in operation.

My invention is also concerned with a torch having one element of the mixing mechanism interchangeable so that the torch can be employed with tips of different sized apertures without the necessity of changing the pressure of the gases supplied to the mixer either by adjusting the pressure regulators on the supply tanks or the valves connected with the torch.

To illustrate my invention, I annex hereto a sheet of drawings in which the same reference characters are used to designate identical parts in all the figures, of which—

Fig. 1 is a side elevation of a torch embodying my invention;

Fig. 2 is a central longitudinal section through the portion of the torch in which the mixing of the gases occurs; and Fig. 3 is a central longitudinal section through a mixing nipple having the passages of a different size from the one shown in Fig. 2.

My invention may be embodied in various forms of torch, but I have shown it as embodied in a customary form in which the handle 10 is formed of a tube secured at its rear end upon a valve piece 11 and at its front end on a head piece 12, the valve piece 11 having the customary oxygen valve 13 which controls the passage leading through the valve piece 11 and into the tube 14 threaded thereinto, while the acetylene valve 15 similarly controls a passage through the valve piece 11 and connected to the acetylene tube 16 threaded thereinto.

The tubes 14 and 16 are threaded at their other ends into the head piece 12, which may be of any desired exterior conformation, except that the forward portion thereof must be threaded to receive the connecting nut 17 which has the internal annular shoulder 18, and is preferably provided with the knurled portions 19 for turning by hand and with the hexagonal portion 20 to receive a wrench. The head piece 12 has the annular seat 21 formed on its forward end and adapted to cooperate with the rounded end 22 of the tubular member 23 which, as shown, constitutes a part of the connections between the mixer and the nozzle 24 from which the gas mixture for the flame issues in the customary manner. The tubular connection 23 is illustrated as connected to the nozzle 24 by the tube 25, all of which connections may be of any desired construction.

The head piece 12 within the seat 21 is provided with the enlargement or annular chamber 26 which is connected by the passage 27 with the acetylene pipe 16. Within the enlargement 26 is a reduced internally threaded portion 28, the inner end of which is connected by the passage 29 with the oxygen tube 14. The nipple 30 has the small longitudinal passage 31 extending centrally therethrough and preferably flared, as seen at 32, at its inner end, which is externally threaded so as to be tightly screwed into the portion 28 of the head piece. The nipple 30 has the greatest diameter toward its central portion, and the shoulder 33 is preferably formed thereon to cooperate with the inner portion of the seat 21 and determine the exact position of the nipple relative to the enlargement 26; this exact positioning being desirable to ensure the outer ends of the fine transverse and preferably slightly inclined passages 34 formed in the nipple registering with the enlargement, as shown. The tubular member 23 has the annular flange 35 formed on its inner end to cooperate with the complementary flange 18 formed on the nut 17 so that when the nut is tightened up, the joint between the surfaces 21 and 22 will be gas tight. The curvature given to the surface 22 enables me to secure a tight fit, even if there should be a slight variation between the axes of the handle and the connection 23. The internal bore of the connection 23 is preferably reduced by forming the shoulder at 36, said shoulder corresponding to the similar shoulder 37 formed by a reduction in the diameter of the nipple 30, the reduced outer portion of which fits snugly in the correspondingly reduced portion of the bore of the connecting tube 23. The outer end of the nipple 30 is preferably tapered, as shown, and joins the internal taper 38 formed in the tubular connection 23 and leading to the reduced bore 39 through which the mixed gases pass on through the part 25 to the nozzle 24.

The operation of my improved torch will be readily apparent: When the parts are assembled, turning the connecting nut 17 will clamp all the parts together tightly, and oxygen gas coming through the tube 14 and entering the flaring end 32 of the nipple 30 is met by the acetylene gas from the tube 16 flowing in through the passages 34 to form the mixture in the nipple, which mixture emerging from the outer end of the longitudinal passage 34 expands in the bore 39 and in the expanded state passes on to the nozzle 24 where it is burned in the customary manner.

With the torch heretofore described, the mixing apparatus would not be suitable for nozzles or tips of different sizes, i. e. having different sized apertures to burn different sized flames, as if it were designed for a nozzle having a large aperture so that the velocity of the mixture through the tubes 23 and 25 was all right to burn properly and prevent back firing, if a nozzle or tip having a substantially smaller aperture to burn a smaller flame was substituted, with the pressure of the gases unchanged, the velocity of the mixture through these tubes 23 and 25 would be slowed up so much that there would be a likelihood of the torch back firing. To eliminate this possibility, I preferably provide the torch with a plurality of nipples 30, preferably one for each size of nozzle or tip, and change the nipple whenever the tip is changed. These different nipples are interchangeable in the torch the same as the tips, the only difference in these nipples being in the size of the bores 31 and passages 34, which will be smaller for the smaller sized nozzles or tips, as illustrated in Fig. 3, where the nipple 30ª is designed to be used with a tip or nozzle having a smaller aperture than the one adapted to be used with the nipple 30 shown in Fig. 2.

While I have shown and described my invention embodied in the form which I consider best adapted to carry out its purposes, it will be understood that it is capable of modifications, and that I do not desire to be limited in the interpretation of the following claims except as may be necessitated by the state of the prior art.

What I claim as new and desire to secure by Letters Patent of the United States, is—

1. In a device of the class described, the combination with a head piece provided with two inlets and having a threaded exterior and in one end of its interior a seat within which there is an enlargement and a threaded connection with one of said inlets, the other being connected with the enlargement, of a nipple having a longitudinal passage therethrough and one end threaded to be screwed into the threaded connection and having fine transverse passages registering exteriorly with the enlargement and opening at their inner ends into the longitudinal passage, a tubular member surrounding the nipple and having its flanged end engaging the seat, and a connecting nut screwed onto the head piece and having an annular internal shoulder engaging the flange of the tubular member, substantially as and for the purpose described.

2. In a device of the class described, the combination with a head piece provided with two inlets and having a threaded exterior and in one end of its interior a seat within which there is an enlargement and a threaded connection with one of said inlets, the other being connected with the enlargement, of a nipple having a longitudinal passage therethrough and one end threaded to be screwed into the threaded connection and having fine transverse passages registering exteriorly with the enlargement and opening at their inner ends into the longitudinal passage and having an annular shoulder engaging the inner portion of the seat, a tubular member surrounding the nipple and having its flanged end engaging the seat, and a connecting nut screwed onto the head piece and having an annular internal shoulder engaging the flange of the tubular member, substantially as and for the purpose described.

3. In a device of the class described, the combination with a head piece provided with two inlets and having a threaded exterior and in one end of its interior a seat within which there is an enlargement and a threaded connection with one of said inlets, the other being connected with the enlargement, of a nipple having a longitudinal passage therethrough and one end threaded to be screwed into the threaded connection and having fine transverse passages registering exteriorly with the enlargement and opening at their inner ends into the longitudinal passage, a tubular member surrounding the nipple and having its flanged end engaging the seat, and a connecting nut screwed onto the head piece and having an annular internal shoulder engaging the flange of the tubular member, said tubular member having its internal diameter beyond the nipple reduced but larger than that of the longitudinal passage through the nipple, substantially as and for the purpose described.

4. In a device of the class described, the combination with a head piece provided with two inlets and having a threaded exterior and in one end of its interior a seat within which there is an enlargement and a threaded connection with one of said inlets, the other being connected with the enlargement, of a nipple having a longitudinal passage therethrough and one end threaded to be screwed into the threaded connection and having fine transverse passages registering exteriorly with the enlargement and opening at their inner ends into the longitudinal passage and having an annular shoulder engaging the inner portion of the seat, a tubular member surrounding the nipple and having its flanged end engaging the seat, and a connecting nut screwed onto the head piece and having an annular internal shoulder engaging the flange of the tubular member, said tubular member having its internal diameter beyond the nipple reduced but larger than that of the longitudinal passage through the nipple, substantially as and for the purpose described.

5. In a device of the class described, the combination with a head piece provided with two inlets and having a threaded exterior and in one end of its interior a seat within which there is an enlargement and a threaded connection with one of said inlets, the other being connected with the enlargement, of a plurality of nipples each having a longitudinal passage therethrough and one end threaded to be screwed into the threaded connection and having fine transverse passages registering exteriorly with the enlargement and opening at their inner ends into the longitudinal passage, a tubular member surrounding the nipple and having its flange end engaging the seat, and a connecting nut screwed onto the head piece and having an annular internal shoulder engaging the flange of the tubular member, said nipples having their passages of different sizes for different sized flames and adapted to be connected one at a time in the head piece, substantially as and for the purpose described.

In witness whereof, I have hereunto set my hand this 18th day of November, 1925.

ROBERT D. McINTOSH.